United States Patent [19]

Zepeda

[11] 4,228,823
[45] Oct. 21, 1980

[54] GARDEN HOSE THREAD PROTECTOR

[76] Inventor: Lamberto C. Zepeda, 492 Santa Rita, Superior, Ariz. 85273

[21] Appl. No.: 56,339

[22] Filed: Jul. 10, 1979

Related U.S. Application Data

[63] Continuation of Ser. No. 894,571, Apr. 7, 1978, abandoned.

[51] Int. Cl.³ .............................................. B65D 59/06
[52] U.S. Cl. ................................. 138/96 R; 138/96 T
[58] Field of Search ................. 138/96 R, 96 T; 16/2, 16/108; 220/375, 327, 306

[56] References Cited

U.S. PATENT DOCUMENTS

| | | | |
|---|---|---|---|
| 1,477,261 | 12/1923 | Hart | 220/375 |
| 1,633,197 | 6/1927 | Snyder | 220/375 |
| 1,708,657 | 4/1929 | Brown et al. | 138/96 T |
| 1,836,811 | 12/1931 | McNeal | 220/375 |
| 3,247,998 | 4/1966 | Tantlinger | 220/375 |

*Primary Examiner*—Lenard A. Footland
*Attorney, Agent, or Firm*—Don J. Flickinger

[57] ABSTRACT

A protector for the threaded end of a garden hose comprising a cylindrical cap of a rigid material such as plastic and having an internal flange which engages the end of the hose. The cap is internally threaded and a tab integral with the flange is formed with an opening. A tether of a flexible material such as rubber or plastic comprises a strip having a ring integral with one end and extending inwardly from this ring are a plurality of angularly spaced projections which adapt the ring to the size of a particular hose. A tongue is integral with and normal to the other end of the strip and is formed with an orifice that aligns with the opening in the tab to receive a screw.

7 Claims, 8 Drawing Figures

GARDEN HOSE THREAD PROTECTOR

This is a continuation, of application Ser. No. 894,571, filed Apr. 7, 1978, now abandoned.

The present invention relates to the threaded end of a conventional garden hose and is concerned primarily with a protector for the threads which is adapted to be detachably mounted on hoses of various diameteric dimensions.

BACKGROUND OF THE INVENTION

At the present time, conventional garden hoses are meeting with wide-spread, but intermittent, usage. Such a conventional hose includes a flexible tube having a fitting at one end which is both internally and externally threaded. Such threads are commonly formed in a thin, sheet metal nipple which is susceptible of being damaged or impaired when some extraneous force or stress is applied thereto. This is particularly true for those periods during which the hose is not in use and this nipple remains unconnected to any other fitting. Such condition ordinarily occurs when the hose is rolled into a coil and stored in a basement, shed, or similar place.

While the known prior art includes examples of protectors for pipe threads and also of a tether which secures a protective cap for a lubricating fitting in position, it is singularly lacking in a device which is particularly adapted for application to the threads of a conventional garden hose and which accommodates hoses of different diametric dimensions.

Before this application was prepared, a patentability search was conducted on the present subject and this search brings to light the following patents as those found coming closest to the instant device:

| Seiler | 2,409,396 | Stillwaggon | 1,502,444 |
| Averett | 2,708,950 | Gibbs | 1,134,605 |
| Groh et al. | 2,824,579 | Miller | 2,599,472 |
| Gray | 3,104,681 | Rothfus | 1,712,232 |
| Yocum | 3,586,654 | Pinder | 2,622,759 |

A brief comment is made on the more pertinent of these prior art patents as follows:

Groh et al.

This patent discloses the broad concept of providing a thread protector for a pipe end which is temporarily secured in effective position. It is recognized that a garden hose falls within the term of a pipe. This patented device is lacking in a tether for securing the thread-protecting cap in position on the pipe or hose, as the case may be.

Gray

This is another example of a protector for the threaded end of a pipe. FIG. 3 of this patent discloses an externally threaded pipe end and a protector therefor but is lacking in a tether.

Yokum

This patent is to a removable seal for the externally threaded end of a fitting. It also is lacking in a tether for the seal.

Miller

This patent discloses the closest approach to the tethered protective cap for the threaded end of a garden hose. A tether is shown in the form of a flexible strap 15 which shows a protective cap for a lubricating fitting in position. The cap is not a thread protector.

No comment is made on the remaining references other than to point out that they are believed to complete the picture of the pertinent prior art relating to the present subject.

OBJECTS OF THE INVENTION

With the foregoing conditions in mind, the present invention has in view of the following objectives:

1. To provide a protective cap for a threaded end of a conventional garden hose which is removably secured in position thereon;

2. To provide, in a garden hose thread protector of the type noted, a tether which secures the protective cap to the body of the hose in a removable manner;

3. To provide, in a device of the character aforesaid, a tether which includes an anchor ring having radially inwardly extending projections adapted to grippingly engage the body of a flexible garden hose and to which ring a tether is connected at one end with the other end being connected to the protective cap;

4. To provide, in a garden hose thread protector of the kind described, a cap having an inturned flange which overlies the threaded nipple at the end of a garden hose and which is formed with a radially inwardly extending tab which is connected to one end of the tether;

5. To provide, in a device of the type noted, a protective cap and tether which are of plastic; and 6. To provide, in a device of the character aforesaid, a modified mode of attaching one end of the tether to the protective cap and which takes the form of a circular opening at the end of the tether which is snapped over a headed button on the cap.

Various other more detailed objects and advantages of the invention such as arise in connection with carrying out the above-noted ideas in a practical embodiment will in part become apparent and in part be hereinafter stated as the description of the invention proceeds.

SUMMARY OF THE INVENTION

In describing the manner of achieving the above objectives, it is first noted that the main body of a garden hose comprises a flexible tube such as one of rubber, rubber composition, or plastic, and has a thin-walled nipple secured thereto at its free end with the nipple presenting both internal and external threads. The protector comprises a cap made of a plastic and consisting of a cylindrical wall that is internally threaded to mate with the external threads of the nipple and has an inturned flange which overlies the end of the nipple. A tab is formed integral with this flange and extends radially inwardly therefrom. This tab is formed with an aperture to be later described.

A tether which preferably is of a plastic which is generally rigid but has the property of flexibility to a rerquired degree, comprises an anchor ring which is removably fitted to the main body of the hose and from which extends a flexible strap having an inturned tongue at its outer free end that is formed with an orifice which aligns with the tab in the cap. A screw passes through the aligned aperture and orifice to maintain the assembled relation.

The anchor ring includes a plurality of angularly spaced inwardly extending projections which are adapted to be bent into a position which is generally normal to the main body of the ring and in which they grippingly engage the hose body to achieve the desired anchoring function.

The foregoing thread protector is assembled on the garden hose by first securing the anchor ring in position, threading the cap onto the external threads of the nipple, and then passing a retaining device such as a screw through the aligned orifice in the tongue and aperture in the tab.

In a modified embodiment, the structural arrangement of the hose and cap is substantially the same as that described above. However, in lieu of the inwardly extending tab on the flange of the cap, the cylindrical wall of the latter is formed with an outwardly projecting headed button. The tethered strap has a circular opening that is dimensioned to fit over this button with a snap fit to achieve the assembled relation.

For a full and more complete understanding of the invention, reference may be had to the following description and accompanying drawing, wherein.

DESCRIPTION OF A PREFERRED EMBODIMENT

Figure 1:
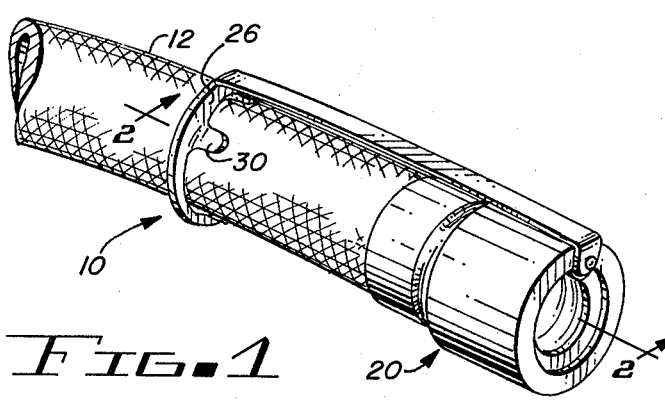
FIG. 1 is a perspective of one end of a conventional garden hose with the thread protector of this invention applied thereto.
Figure 2:
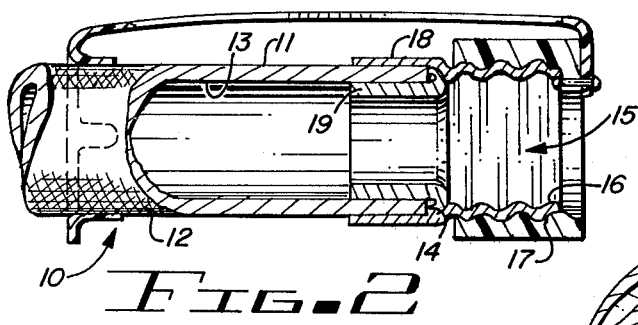
FIG. 2 is a longitudinal section taken about on the plane of the line 2—2 of FIG. 1.
Figure 4:
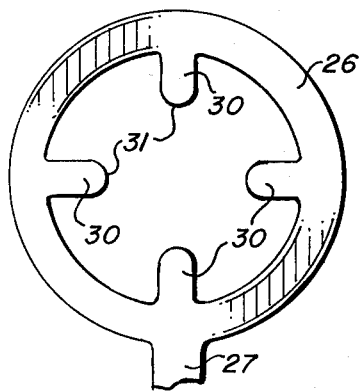
FIG. 4 is a detail elevation of the anchor ring of the tether and which is used in both embodiments of the invention herein disclosed.
Figure 5:
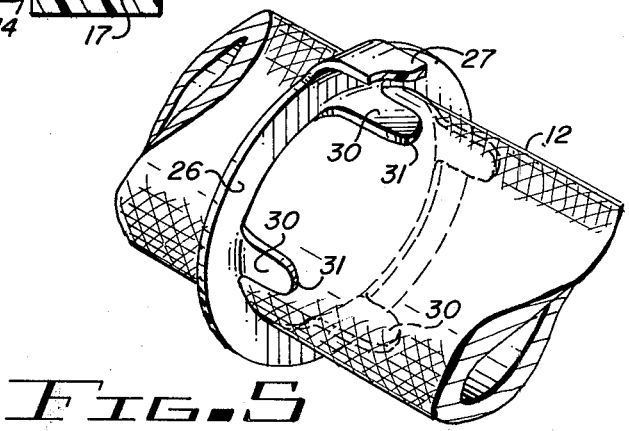
FIG. 5 is a detail perspective showing the anchor ring as applied to the main body of the hose.

An end portion of a conventional garden hose is illustrated in FIGS. 1 and 2 and is referred to in its entirety by the reference character 10. Garden hose 10 includes a main body portion 11 which is flexible and preferably of rubber of a rubber composition such as now employed in the production of garden hoses and has an outer surface 12 having good frictional properties and is of tubular construction provided by a bore 13. This main body portion 11 terminates at a free end 14.

A nipple, designated generally 15, is of comparatively thin metal and presents internal threads 16 and external threads 17. Nipple 15 also includes a cylindrical skirt 18 which overlies the outer surface 12 of main body portion 11 and which, together with a hollow plug 19, secures the nipple 15 in position on main body portion 11.

Figure 3:
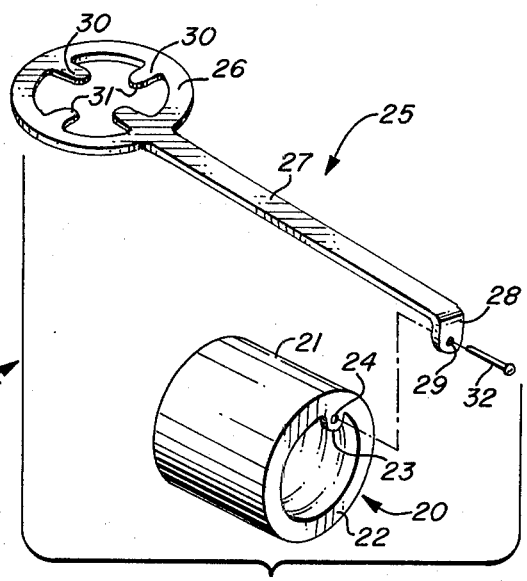
FIG. 3 is a perspective illustrating the protective cap, tether and screw for maintaining the two assembled in exploded relation.

A protective cap is designated generally 20 and comprises a cylindrical wall 21 and an inturned annular flange 22. Cylindrical wall 21 is formed with internal threads which mate with external threads 17 on nipple 15. A tab 23 extends radially inwardly from flange 22 and is formed with an aperture 24 (FIG. 3).

A tether is designated generally 25. It is preferably of a plastic that is fairly rigid but has the property of flexibility to a required degree. Tether 25 comprises an anchor ring 26 at one end from which extends to a tether strap 27 that terminates in a tongue 28 having an orifice 29 therein. Anchor ring 26 is formed with a plurality of angularly spaced projections 30 which preferably have rounded ends 31 to facilitate positioning of the anchor ring on main body portion 11 of hose 10.

FIG. 1 shows the projections 30 as being bent into a position in which they are substantially normal to the plane of anchor ring 26. The degree of such bending will depend on the diametric dimension of the particular hose to which the protective cap is to be applied. It is readily evident that the round ends 31 of projections 30 particularly adapt the anchor ring to be slipped over friction surface 12 of hose body 11.

With the anchor ring 26 properly positioned, protective cap 20 is screwed onto the nipple 15 into the position depicted in FIG. 2. A screw 32 is now passed through aperture 24 and orifice 29 to maintain the assembled relation.

THE MODIFICATION

Figure 7:
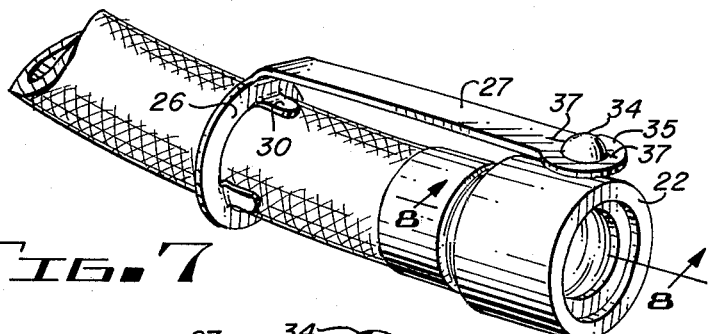
FIG. 7 is a perspective of the modified embodiment.
Figure 6:
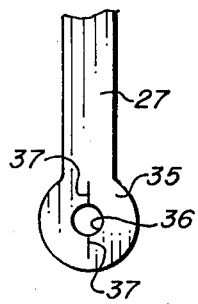
FIG. 6 is a detail elevation of the end of the tethered strap used in a modified embodiment.
Figure 8:
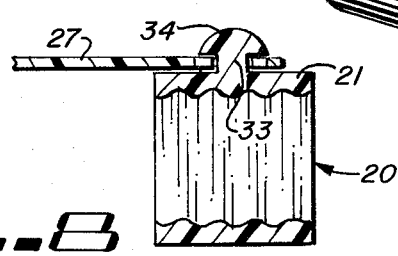
FIG. 8 is a detail section taken on the plane of the line 8—8 of FIG. 7.

As depicted in FIGS. 7 and 8, tab 23 on flange 22 is eliminated and replaced by a button 33 that is integral with cylindrical wall 21 and has a head 34. As shown in FIG. 6, tether strap 27 has a disc-like enlargement 35 at the end remote from anchor ring 26 and which is formed with a circular opening 36 with a pair of diametrically opposed slits 37 communicating with opening 36 so as to facilitate enlargement of the latter as it is fitted over the head 34 of button 33 with a snap fit.

While preferred specific embodiments of the invention are hereinbefore set forth, it is to be clearly understood that the invention is not to be limited to the exact constructions, materials and devices illustrated and described because various modifications of these details may be provided in putting the invention into practice.

What is claimed is:

1. A garden hose comprising:
   a. a flexible tubular body portion including,
      i. an outer surface, and
      ii. a free end; and
   b. a nipple secured to the free end of said body portion and including,
      i. external threads, and
      ii. an end;
   in combination with a protector for said nipple, comprising:
   c. a protective cap including,
      i. a cylindrical wall engaged with the external threads of said nipple, and
      ii. an inturned flange integral with said wall and overlying the end of said nipple, and
   d. a tether for securing said cap to said hose and including,
      i. an anchor ring formed with means for frictionally engaging the outer surface of said body portion,
      ii. a strap having one end integrally joined to said anchor ring and having another end, and
      iii. means at the other end of said strap for detachable securement to said cap.

2. The combination of claim 1 in which the means on said anchor ring for securing it in position on the body position of said hose takes the form of a plurality of angularly spaced projections integral with the ring and bendable into positions substantially normal to the plane of said ring.

3. The combination of claim 2 in which said anchor ring and strap are of plastic and in which the means for securing the protective cap thereto comprises an inturned tongue on the end of said strap remote from said anchor ring, a tab on the flange of said protective cap, said tongue and tab being in overlapping engagement, and means for securing said tongue and tab together.

4. The combination of claim 3 in which the tongue is formed with an orifice and the tab with an aperture, with the aperture and orifice in alignment and the means for securing them together taking the form of a screw passing through said aligned orifice and aperture.

5. The combination of claim 2 in which said projections have rounded ends which facilitate application of the anchor ring to the body portion of said hose.

6. The combination of claim 1 in which the means for securing said cap to the tether comprises a headed button integral with and projecting from the cylindrical wall of the cap and an expansible end portion of said strap having an opening that is snapped onto said headed button.

7. The combination of claim 6 in which said expansible end portion is formed with a plurality of slits extending to said opening to facilitate the expansion of said end portion of the strap.

* * * * *